UNITED STATES PATENT OFFICE.

MARK E. PUTNAM AND JOSEPH W. BRITTON, OF MIDLAND, MICHIGAN, ASSIGNORS TO THE DOW CHEMICAL COMPANY.

METHOD OF PURIFYING AROMATIC ALCOHOLS AND DERIVATIVES.

No Drawing.   Application filed October 1, 1925. Serial No. 59,959.

The present methods of manufacture of benzoic acid from toluene consist of direct oxidation of toluene to benzoic acid, which is very expensive; or the partial or complete chlorination of the methyl group with subsequent oxidation or hydrolysis. This latter method, which while very economical, is open to the objection that the product is contaminated by ortho and para chlorbenzoic acids which are found as by-products and which greatly impair the value of the finished product. Up to the present time, so far as we are aware, no commercially successful method for the complete removal of these by-products has been developed. We have, however, discovered that by heating a salt of the benzoic acids in the presence of a suitable catalyzer, under pressure with a volatile or fixed alkali, preferably ammonia, the chlorbenzoic acid is converted into an amino or hydroxyl compound which can be readily separated from the benzoic acid.

The invention, accordingly, consists of the steps hereinafter fully described and particularly pointed out in the claims, the following description setting forth but one of the various ways in which the principle of the invention may be used.

The following is a specific example of the operation of our improved process as applied to the purification of benzoic acid, viz, 100 grams of benzoic acid, containing between one and two per cent of chlorbenzoic acids, was converted to the sodium salt and was mixed with aqueous ammonia and cuprous chloride as a catalyst and heated in a closed reactor at a temperature of 200° C. for four hours. The reaction mixture was then removed from the reactor, the excess ammonia recovered by distillation, and the benzoic acid liberated with sulphuric acid. After cooling, the benzoic acid was filtered, washed and recrystallized from water. The benzoic acid thus obtained showed less than one one-hundredth (0.01) per cent of chlorine.

Benzyl alcohol is also manufactured from chlorinated toluene by the general process hereinbefore referred to and is similarly contaminated by traces of ortho and parachlor derivatives. These may be removed in the same manner as just described in the case of benzoic acid. It will also be understood that any of the aromatic alcohols and acids when produced by the hydrolysis of aromatic halogen compounds are more or less contaminated by ring halogen compounds. Any such alcohol or acid may be purified of such halogen compounds by heat-treatment herein prescribed, viz, by heating the corresponding salt (where the compound is not already in this form, it of course requires first to be converted as in the specific example given above), in the presence of a suitable catalyzer with a volatile or fixed alkali, preferably ammonia, and then separating out the resulting amino or hydroxyl compound into which the impurity is converted.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of removing a halogenated impurity from an aromatic alcohol, or the corresponding acid or salt, the step which consists in heating the impure compound with an aqueous alkaline solution at temperatures from 100° to 400° C.

2. In a method of removing a halogenated impurity from an aromatic alcohol, or the corresponding acid or salt, the step which consists in heating the impure compound with an aqueous alkaline solution in the presence of a catalyst at temperatures from 100° to 400° C.

3. In a method of removing a halogenated impurity from an aromatic alcohol, or the corresponding acid or salt, the step which consists in heating the impure compound with an aqueous solution of ammonia at temperatures from 100° to 400° C.

4. In a method of removing a halogenated impurity from an aromatic alcohol, or the corresponding acid or salt, the step which consists in heating the impure compound with an aqueous solution of ammonia in the presence of a cuprous compound at temperatures from 100° to 400° C.

5. In a method of removing a halogenated impurity from benzoic acid, the step which consists in heating the impure acid with an aqueous alkaline solution at temperatures from 100° to 400° C.

6. In a method of removing a halogenated impurity from benzoic acid, the step which consists in heating the impure acid with an aqueous solution of ammonia in the presence of a cuprous compound at temperatures from 100° to 400° C.

7. In a method of removing a halogenated impurity from benzoic acid, the step which consists in heating the impure acid with an aqueous solution of ammonia in the presence of cuprous chloride at temperatures from 100° to 400° C.

Signed by us this 28 day of Sept. 1925.

MARK E. PUTNAM.
JOSEPH W. BRITTON.